United States Patent

Lessard et al.

[15] 3,657,696
[45] Apr. 18, 1972

[54] SYSTEM FOR THE REMOTE STARTING OF MOTOR VEHICLE ENGINES

[72] Inventors: Victor Lessard, 3335 Willow Street; Gilles Morin, 3547 Weddel Street, both of Dearborn, Mich. 48124

[22] Filed: June 15, 1970

[21] Appl. No.: 46,259

[52] U.S. Cl. ........................... 340/54, 180/77 R, 290/DIG. 7
[51] Int. Cl. ........................................ B60g 1/00, B60k 33/02
[58] Field of Search ............... 290/DIG. 7, 38 C, 38 X, 38 R; 340/54, 52, 60; 180/77 R, 77 X, 1 R, 1 X

[56] References Cited

UNITED STATES PATENTS

| 3,553,472 | 1/1971 | Arlandson et al. | 290/38 R |
| 3,154,689 | 10/1964 | Bubbenmoyer | 290/38 R |
| 2,873,382 | 2/1959 | Herring | 340/52 |
| 3,455,403 | 7/1969 | Hawthorne | 180/77 X |

Primary Examiner—John W. Caldwell
Assistant Examiner—Glen R. Swann, III
Attorney—Adolph G. Martin

[57] ABSTRACT

A system for the remote starting of motor vehicle engines consisting of an electrical control panel mountable in the home, and detachably connected by an extension cord to the vehicle. Switches on the control panel and electrical components mounted on the vehicle enable the engine to be started from inside the home, and pilot lights adjacent the switches indicate when the engine is in operation. When the engine had idled sufficiently to be warm, it may be stopped by a switch on the control panel, and the driver can then disconnect the extension cord from the vehicle, and re-start the warm engine in the customary manner by using the ignition key. The driver is thus able immediately to heat the interior of the vehicle to a comfortable temperature, as well as benefit from the improved operating efficiency of a warm engine.

1 Claims, 3 Drawing Figures

Patented April 18, 1972

3,657,696

INVENTORS
VICTOR LESSARD
GILLES MORIN
BY Adolph J. Martin
ATTORNEY

SYSTEM FOR THE REMOTE STARTING OF MOTOR VEHICLE ENGINES

BACKGROUND OF THE INVENTION

This invention relates generally to motor vehicles, but more particularly to apparatus, arrangements and systems for the remote starting and operation of motor vehicles. Such systems as are presently known in the art are extremely complex, and accordingly costly to produce and install. Consequently, the idea of remote starting for vehicle engines has understandably had little if any public acceptance.

SUMMARY OF THE INVENTION

This invention consists of a control panel 46 in which are mounted a plurality of electrical switches and pilot lights such as 58 and 62 respectively. An extension cord 42 detachably connects the control panel 46 to the motor vehicle 10. Electrical components and electro-mechanical devices are mounted on the motor vehicle 10 and connected into the applicant's system for operation from the remote control panel 46 to start and stop the vehicle engine 12.

Figures 1, 2, 3:
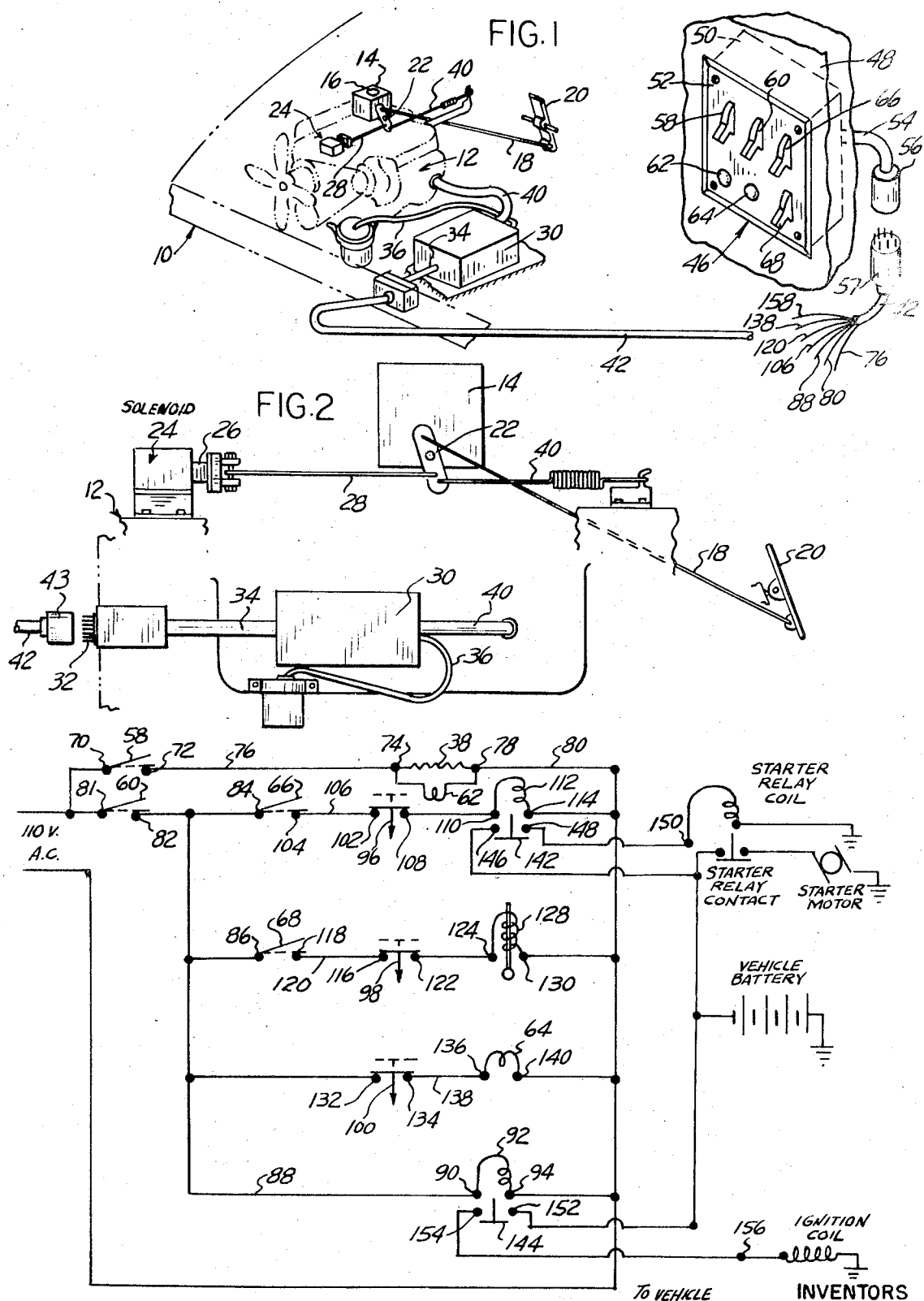
FIG. 1 is a front perspective fragmentary view of a motor vehicle 10, showing certain of the components in the applicant's system mounted on the vehicle 10.
FIG. 2 is an enlarged elevation view showing the electrical solenoid 24 and the pivotally attached flexible cable 28 operatively connected to the linkage 18 associated with the accelerator pedal 20.
FIG. 3 is a schematic diagram showing the electrical circuitry comprising the applicant's system.

For a more detailed description of the invention, reference is made to the drawing in which numeral 10 designates a conventional motor vehicle having an internal combustion engine 12 including a carburetor 14 with an air intake 16. A throttle valve, not here shown, is disposed within the air intake 16, and connected by the usual linkage 18 to an accelerator pedal 20. An automatic choke valve, not shown, is also disposed within the air intake 16 and connected in the ordinary manner by a pivoted member 22 to the linkage 18.

CONSTRUCTION

A solenoid 24, having an armature 26, is mounted on the forward portion of the engine 12. A flexible cable 28 is pivotally connected between the armature 26 and the linkage 18 associated with the accelerator pedal 20. A junction box 30, for housing certain electrical components to be described later, is mounted on the motor vehicle 10. A male electrical connector 32, supported on the forward end of the motor vehicle 10, is connected to a multiple conductor cable 34, which terminates in the junction box 30 for connection in a manner hereinafter described.

A flexible tubular member 36, connected into the pressurized oil system of the engine 12, terminates in the junction box 30 for connection to certain electrical components to be hereinafter designated. An electrical block heater 38, indicated schematically in FIG. 3, has a connector cable 40 terminating in the junction box 30 for connection as hereinafter described. A multiple conductor extension cord 42, has on one end thereof a female connector 43 for connecting a remote control panel 46 to the male electrical connector on the forward end of the motor vehicle 10.

The remote control panel 46 may be mounted on a fixed support, such as the wall 48 of a home, as illustrated in FIG. 1 of the drawing. The remote control panel 46 comprises an outlet box 50 having a removable cover plate 52, and a multiple conductor electrical cord 54 extending through the wall 48 and provided with a terminal female connector 56 for reception of a male connector 57 on the extension cord 42. A pair of toggle switches 58 and 60, two pilot lights 62 and 64, and a pair of normally open reset switches 66 and 68 are all mounted in the outlet box 50 for electrical connection in a manner to be hereinafter described.

ELECTRICAL CIRCUITRY

Referring to FIG. 3, the electrical schematic drawing, one terminal 70 of the toggle switch 58 is connected to a source of 110 volt alternating current electrical potential. The other terminal 72 of the toggle switch 58 is connected to one terminal 74 of the block heater 38, by a conductor 76 in the extension cord 42. The other terminal 78 of the block heater 38 is connected to the source of 110 volt electrical potential by a conductor 80 in the extension cord 42. The pilot light 62 in the control panel 46 is connected across the terminals 74 and 78 of the block heater 38.

One terminal 81 of the toggle switch 60 is connected to the source of 110 volt electrical potential, and the other terminal 82 connects to terminals 84 and 86 on the reset switches 66 and 68 respectively. Terminal 82 of the toggle switch 60 is also connected, through a conductor 88 in the extension cord 42, to one terminal 90 of a relay coil 92. The other terminal 94 on the relay coil 92 is connected directly to the source of 110 volt electrical potential. Three normally closed pressure switches 96, 98, and 100 are actuated by pressure transmitted through the flexible tubular member 36 from the pressurized oil system of the engine 10.

One terminal 102 of the pressure switch 96 is connected to the other terminal 104 on the reset switch 66 by a conductor 106 in the extension cord 42. The other terminal 108 on the pressure switch 96 is connected to one terminal 110 of a relay coil 112. The other terminal 114 of the relay coil 112 is connected to the source of 110 volt electrical potential. One terminal 116 of the pressure switch 98 is connected to the other terminal 118 on the reset switch 68 by a conductor 120 in the extension cord 42. The other terminal 122 on the pressure switch 98 is connected to one terminal 124 of the coil 128 on the solenoid 24.

The other terminal 130 on the solenoid coil 128 is connected to the source of 110 volt electrical potential. One terminal 132, of the pressure switch 100, is connected to terminal 90 on the relay coil 92, and the other terminal 134 is connected to one terminal 136 of the pilot light 64 through a conductor 138 in the extension cord 42. The other terminal 140 of the pilot light 64 is connected to the source of 110 volt electrical potential.

Two normally open relay contacts 142 and 144, controlled by relay coils 112 92 respectively, are connected into the 12 volt electrical system for the vehicle 10. One terminal 146 of the relay contact 142 is connected to the ungrounded terminal of the vehicle battery. The other terminal 148, of the relay contact 142, is connected to the ungrounded terminal 150 of the starter relay coil in the vehicle 10 so as to by-pass the conventional starter switch, not here shown.

One terminal 152 of the relay contact 144 is connected to the ungrounded terminal of the vehicle battery. The other terminal 154, of the relay contact 144, is connected directly to the ungrounded terminal 156 of the ignition coil of the vehicle 10 so as to by-pass the conventional key-operated ignition switch, not here shown. A ground, provided in the outlet box 50 in the conventional manner, is connected by a conductor 158 in the extension cord 42, to the chassis of the vehicle 10.

The preceding discussion completes a description of the construction and electrical circuitry relating to the applicant's invention herein disclosed. However, to facilitate a more thorough and comprehensive understanding of the subject matter, a discussion is immediately hereinafter directed to the manner in which the system operates to accomplish its intended purpose, and fulfill its intended function.

USE AND OPERATION

In use, when it is desired to activate the applicant's system, toggle switch 60 is moved to the broken line position shown in FIG. 3, and the reset switch 68 is held closed, thereby energizing the solenoid 128. The armature 26 is thus caused to shift thereby exerting a pull on the flexible cable 28 so as to close the automatic choke valve and actuate the linkage 18 to pump gasoline into the carburetor 14 of the vehicle 10.

Relay coil 92 is simultaneously energized, thereby closing the normally open relay contact 144, and completing the ignition circuit for the vehicle 10. The pilot light 64, on the remote control panel 46, is also energized indicating that the system is activated, but that the engine 12 is not yet in operation. Reset switch 66 is then held closed thereby energizing relay coil 112, which closes the normally open relay contact 142 and completes the starter circuit for the vehicle 10.

When the engine 12 starts, pressure switches 96 and 98 open the electric circuits to the vehicle starter and the solenoid 128 respectively. This protects the starter mechanism, and permits the engine 12 to operate at idling speed. Pressure switch 100 also opens when the engine 12 is in operation, thereby interrupting the circuit to the pilot light 64 on the control panel 46 in the home. The pilot light 64 thus remains off while the engine 12 is in operation.

After the engine 12 has been operating for a sufficient period of time to reach the desired temperature, the toggle switch 60 is returned to the open or full line position shown in FIG. 3, thereby de-activating the system. The driver can then re-start the warm engine 12 in the usual manner by entering the vehicle 10 and using the ignition key. Running the engine 12 prior to driving, insures good operation, and enables the driver to heat immediately the interior of the vehicle 10.

If it is desired to provide a continuous source of heat for the engine 12 while the engine 10 is idle, the toggle switch 58 is shifted to the closed or broken line position shown in FIG. 1. The block heater 38 is thereby energized, and provides heat continuously until the toggle switch 58 is shifted to the off or full line position. The pilot light 62 on the control panel 46 indicates whether or not the block heater 38 is in operation.

In practice, it may not be desirable to have a block heater 38 incorporated into the electrical system. If the vehicle 10 is to be exposed only to moderately cold temperatures, a block heater 38 would not be necessary to insure remote starting of the vehicle 10. In such installations therefore, the toggle switch 58 and the pilot light 62 on the remote control panel 46 are not connected into the system.

In the event any attempt is made to steal the vehicle 10 while the engine 12 is in operation during the warm-up period, the engine 12 will stop when the extension cord 42 is disconnected from the vehicle 10. This occurs automatically since the relay contact 144, which by-passes the vehicle ignition switch, will open when relay coil 92 is de-energized by separating connectors 43 and 42 at the vehicle 10. The applicant's system therefore makes the vehicle 10 no more vulnerable to theft than any other garaged or unattended vehicle.

Based upon the foregoing discussion, the applicant is of the opinion that his invention has fulfilled a long-felt need in the automotive field, and that he has accordingly made a valuable contribution to the related art. However, while the invention was described with reference to the structural details of only a single embodiment, it will be appreciated by those familiar with the art that the principles involved are susceptible of numerous other practical adaptations.

I therefore claim as new, and desire to secure by Letters Patent:

1. A system for the remote starting of a motor vehicle having an internal combustion engine with an air intake, a control valve for the air intake, a throttle valve, accelerator linkage for operating the control and throttle valves, a starter circuit, an ignition circuit, and switch means controlling the ignition and starter circuits of the vehicle, such system comprising three normally closed pressure switches adapted to open when the engine is in operation, electrical means for actuating the accelerator linkage so as to close the control valve and operate the throttle valve preparatory to starting the engine, a first electrical circuit including a remote normally open reset switch and one of the normally closed pressure switches controlling the electrical means for actuating the accelerator linkage, a second electrical circuit including a relay having a normally open contact controlling the ignition circuit of the motor vehicle so as to by-pass the switch means of the vehicle, a third electrical circuit including a remote normally open reset switch, the second normally closed pressure switch and a relay having a normally open contact controlling the starter circuit of the motor vehicle so as to by-pass the switch means of the vehicle, a fourth electrical circuit including the third normally closed pressure switch and a pilot light for indicating whether or not the engine is in operation, and a remote line switch connecting the electrical circuits to a source of electrical potential.

* * * * *